United States Patent
Loman et al.

(10) Patent No.: US 9,396,424 B1
(45) Date of Patent: Jul. 19, 2016

(54) RADIO FREQUENCY INDUCED POWER RECEPTION MANAGEMENT FOR A RADIO FREQUENCY IDENTITY (RFID) CHIP EMBEDDED IN A MOBILE COMMUNICATION DEVICE

(71) Applicant: Sprint Communications Company L.P., Overland Park, KS (US)

(72) Inventors: Clinton H. Loman, Raymore, MO (US); Douglas A. Olding, Overland Park, KS (US); Lyle W. Paczkowski, Mission Hills, KS (US); Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/532,954

(22) Filed: Nov. 4, 2014

(51) Int. Cl.
*H04B 5/00* (2006.01)
*G06K 19/07* (2006.01)
*H04B 7/06* (2006.01)

(52) U.S. Cl.
CPC ........ *G06K 19/0712* (2013.01); *G06K 19/0727* (2013.01); *H04B 7/0602* (2013.01)

(58) Field of Classification Search
CPC ............ G06K 19/0723; G06K 7/0008; G06K 19/07749; G06K 2017/0045; H04B 5/02; H04B 5/0012; H04B 5/00; H04B 1/48; H04B 1/44; H04B 1/525; H04W 84/18; H04W 88/06; H04W 76/02
USPC .............. 455/41.1, 41.2, 41.3, 77, 78, 79, 82, 455/418–420, 422.1, 550.1; 340/10.1
See application file for complete search history.

(56) References Cited

U.S. PATENT DOCUMENTS

| 6,177,860 | B1 | 1/2001 | Cromer et al. |
| 7,245,213 | B1 | 7/2007 | Esterberg et al. |
| 7,366,806 | B2 | 4/2008 | Milenkovic et al. |
| 7,450,010 | B1 | 11/2008 | Gravelle et al. |
| 7,834,743 | B2 * | 11/2010 | Nagata ............... G06K 19/0723 340/10.4 |
| 7,924,156 | B2 | 4/2011 | Colby |
| 8,138,922 | B2 | 3/2012 | Lindsay et al. |
| 8,174,384 | B2 | 5/2012 | Stagg |
| 8,217,793 | B2 | 7/2012 | Broer |
| 8,311,509 | B2 * | 11/2012 | Feher .................... H04M 3/382 455/132 |

(Continued)

OTHER PUBLICATIONS

Office Action dated Nov. 19, 2015, U.S. Appl. No. 13/857,139, filed Apr. 4, 2013.

(Continued)

*Primary Examiner* — Nhan Le

(57) ABSTRACT

A mobile communication device. The mobile communication device comprises a motherboard comprising a communication bus, a cellular radio frequency transceiver connected to the communication bus, a plurality of antennas, at least one of the antennas communicatively coupled to the cellular radio frequency transceiver, and a processor connected to the communication bus. The mobile communication device further comprises a radio frequency identity (RFID) chip connected to the communication bus, wherein the RFID chip comprises a memory, provides wireless read access to the memory, and provides write access to the memory to the communication bus. The mobile communication device further comprises an antenna switch to selectably couple at least one of the antennas to the RFID chip and an application that selects the antenna switch to couple one of the antennas to the RFID chip based on a state of the mobile communication device.

17 Claims, 5 Drawing Sheets

(56) References Cited

U.S. PATENT DOCUMENTS

| | | | |
|---|---|---|---|
| 8,471,708 B1 | 6/2013 | Diorio et al. |
| 8,487,769 B2 | 7/2013 | Lindsay et al. |
| 8,718,554 B2 | 5/2014 | Abel |
| 8,797,144 B2 | 8/2014 | Hinman et al. |
| 8,811,971 B2 | 8/2014 | Corda et al. |
| 8,816,826 B2 | 8/2014 | Colby |
| 8,866,594 B1 | 10/2014 | Diorio et al. |
| 9,087,318 B1 | 7/2015 | Cordes et al. |
| 9,171,243 B1 | 10/2015 | Cordes et al. |
| 9,286,594 B1 | 3/2016 | Cordes et al. |
| 9,324,016 B1 | 4/2016 | Cordes et al. |
| 2005/0045719 A1 | 3/2005 | Yang |
| 2005/0123596 A1 | 6/2005 | Kohane et al. |
| 2005/0125396 A1 | 6/2005 | Liu |
| 2006/0258289 A1 | 11/2006 | Dua |
| 2007/0035381 A1 | 2/2007 | Davis |
| 2007/0069852 A1 | 3/2007 | Mo et al. |
| 2007/0075140 A1 | 4/2007 | Guez et al. |
| 2008/0051142 A1 | 2/2008 | Calvet et al. |
| 2008/0198098 A1 | 8/2008 | Gelbman et al. |
| 2008/0232259 A1 | 9/2008 | Thomson |
| 2008/0303637 A1 | 12/2008 | Gelbman et al. |
| 2009/0164800 A1 | 6/2009 | Johansson et al. |
| 2009/0227290 A1 | 9/2009 | Chien |
| 2010/0075669 A1 | 3/2010 | Sparks et al. |
| 2011/0063093 A1 | 3/2011 | Fung et al. |
| 2011/0254687 A1 | 10/2011 | Arponen et al. |
| 2012/0149338 A1 | 6/2012 | Roundtree |
| 2012/0150601 A1 | 6/2012 | Fisher |
| 2012/0184367 A1 | 7/2012 | Parrott et al. |
| 2012/0196586 A1 | 8/2012 | Grigg et al. |
| 2012/0238206 A1 | 9/2012 | Singh et al. |
| 2012/0262281 A1 | 10/2012 | Edwards et al. |
| 2013/0105565 A1 | 5/2013 | Kamprath |
| 2013/0175984 A1 | 7/2013 | Yamazaki et al. |
| 2014/0141718 A1 | 5/2014 | Stromberg et al. |

OTHER PUBLICATIONS

Office Action dated Nov. 2, 2015, U.S. Appl. No. 13/873,813, filed Apr. 30, 2013.
Notice of Allowance dated Oct. 29, 2015, U.S. Appl. No. 14/732,846, filed Jun. 8, 2015.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Restriction Requirement dated Jul. 31, 2015, U.S. Appl. No. 13/873,813, filed Apr. 30, 2013.
Office Action dated Jul. 9, 2015, U.S. Appl. No. 14/732,846, filed Jun. 8, 2015.
Cordes, Kevin R., et al., "Visually Readable Electronic Label," filed on Jun. 8, 2015, U.S. Appl. No. 14/732,846.
Cordes, Kevin R., et al., "Digest of Biographical Information for an Electronic Device with Static and Dynamic Portions", filed on Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138.
Cordes, Kevin R., et al., "Prevention of Inductive Coupling Between Components of a Mobile Communication Device ", filed on Apr. 30, 2013, U.S. Appl. No. 13/873,813.
Cordes, Kevin R., et al., "Visually Readable Electronic Label", filed on Nov. 8, 2013, U.S. Appl. No. 14/076,164.
Cordes, Kevin R., et al., "Autonomous Authentication of a Reader by a Radio Frequency Identity (RFID) Device", filed on Feb. 27, 2014, U.S. Appl. No. 14/192,316.
Office Action dated Nov. 4, 2014, U.S. Appl. No. 14/076,164, filed Nov. 8, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Mar. 6, 2015, U.S. Appl. No. 14/076,164, filed Nov. 8, 2013.
Cordes, Kevin R., et al., entitled, "Virtual Private Network (VPN) Tunneling in a User Equipment (UE) Brokered by a Radio Frequency Identity (RFID) Chip Communicatively Coupled to the User Equipment," filed Apr. 27, 2015, U.S. Appl. No. 14/696,835.
Restriction Requirement dated Jan. 5, 2015, U.S. Appl. No. 13/857,139 filed Apr. 4, 2013.
Notice of Allowance dated Dec. 17, 2015, U.S. Appl. No. 13/857,141, filed Apr. 4, 2013.
FAIPP Pre-Interview Communication dated Feb. 25, 2016, U.S. Appl. No. 14/192,316, filed Feb. 27, 2014.
Cordes, Kevin R., et al., "Digest of Biographical Information for an Electronic Device with Static and Dynamic Portions," filed on Mar. 14, 2016, U.S. Appl. No. 15/069,921.
Notice of Allowance dated Mar. 26, 2016, U.S. Appl. No. 13/857,139, filed Apr. 4, 2013.
Notice of Allowance dated Apr. 22, 2016, U.S. Appl. No. 13/873,813, filed Apr. 30, 2013.
Notice of Allowance dated Jun. 1, 2016, U.S. Appl. No. 14/192,316, filed Feb. 27, 2014.

\* cited by examiner

RADIO FREQUENCY INDUCED POWER RECEPTION MANAGEMENT FOR A RADIO FREQUENCY IDENTITY (RFID) CHIP EMBEDDED IN A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips or tags are commonly used to promote inventory tracking in retail stores and warehouses. RFID chips may also be implanted in animals, for example pets, to promote identification of a lost animal. RFID chips are small and inexpensive devices that typically draw power from an incident radio frequency field that may be radiated by a scanning device that reads the information that the RFID chip transmits. A RFID chip may be about three times the size of a grain of rice or smaller. RFID chips may be adhered to inventory items or suspended under the skin of an animal.

SUMMARY

In an embodiment, a mobile communication device is disclosed. The mobile communication device comprises a motherboard comprising a communication bus, a cellular radio frequency transceiver connected to the communication bus of the motherboard, a plurality of antennas, at least one of the antennas communicatively coupled to the cellular radio frequency transceiver, and a processor connected to the communication bus of the motherboard. The device further comprises a radio frequency identity (RFID) chip connected to the communication bus of the motherboard, wherein the RFID chip comprises a memory, provides wireless read access to the memory, and provides write access to the memory to the communication bus of the motherboard. The device further comprises an antenna switch to selectably couple at least one of the antennas to the RFID chip and an application that selects the antenna switch to couple one of the antennas to the RFID chip based on a state of the mobile communication device.

In another embodiment, a mobile communication device is disclosed. The device comprises a motherboard comprising a communication bus, a cellular radio frequency transceiver connected to the communication bus of the motherboard, a plurality of antennas, at least one of the antennas communicatively coupled to the cellular radio frequency transceiver, and a processor connected to the communication bus of the motherboard. The device further comprises a radio frequency identity (RFID) chip connected to the communication bus of the motherboard, wherein the RFID chip comprises a memory that stores data about an activation state of the mobile communication device, provides wireless read access to the memory, and provides write access to the memory to the communication bus of the motherboard. The device further comprises an antenna switch to selectably couple one of the antennas to the RFID chip and an application that selects the antenna switch to couple one of the antennas to the RFID chip based on the activation state of the mobile communication device stored in the memory.

In yet another embodiment, a mobile communication device is disclosed. The device comprises a motherboard comprising a communication bus, a cellular radio frequency transceiver connected to the communication bus of the motherboard, a plurality of antennas, at least one of the antennas communicatively coupled to the cellular radio frequency transceiver, and a processor connected to the communication bus of the motherboard. The device further comprises a radio frequency identity (RFID) chip connected to the communication bus of the motherboard, wherein the RFID chip comprises a memory, provides wireless read access to the memory, and provides write access to the memory to the communication bus of the motherboard and a power dissipation filter. The device further comprises an antenna switch to selectably couple one of the antennas to the RFID chip and to selectably couple the antenna to the power dissipation filter and an application that selects the antenna switch to couple one of the antennas to the RFID chip based on a state of the mobile communication device and that selects the antenna switch to couple the antenna to the power dissipation filter when an induced power level delivered to the RFID chip exceeds a pre-defined threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
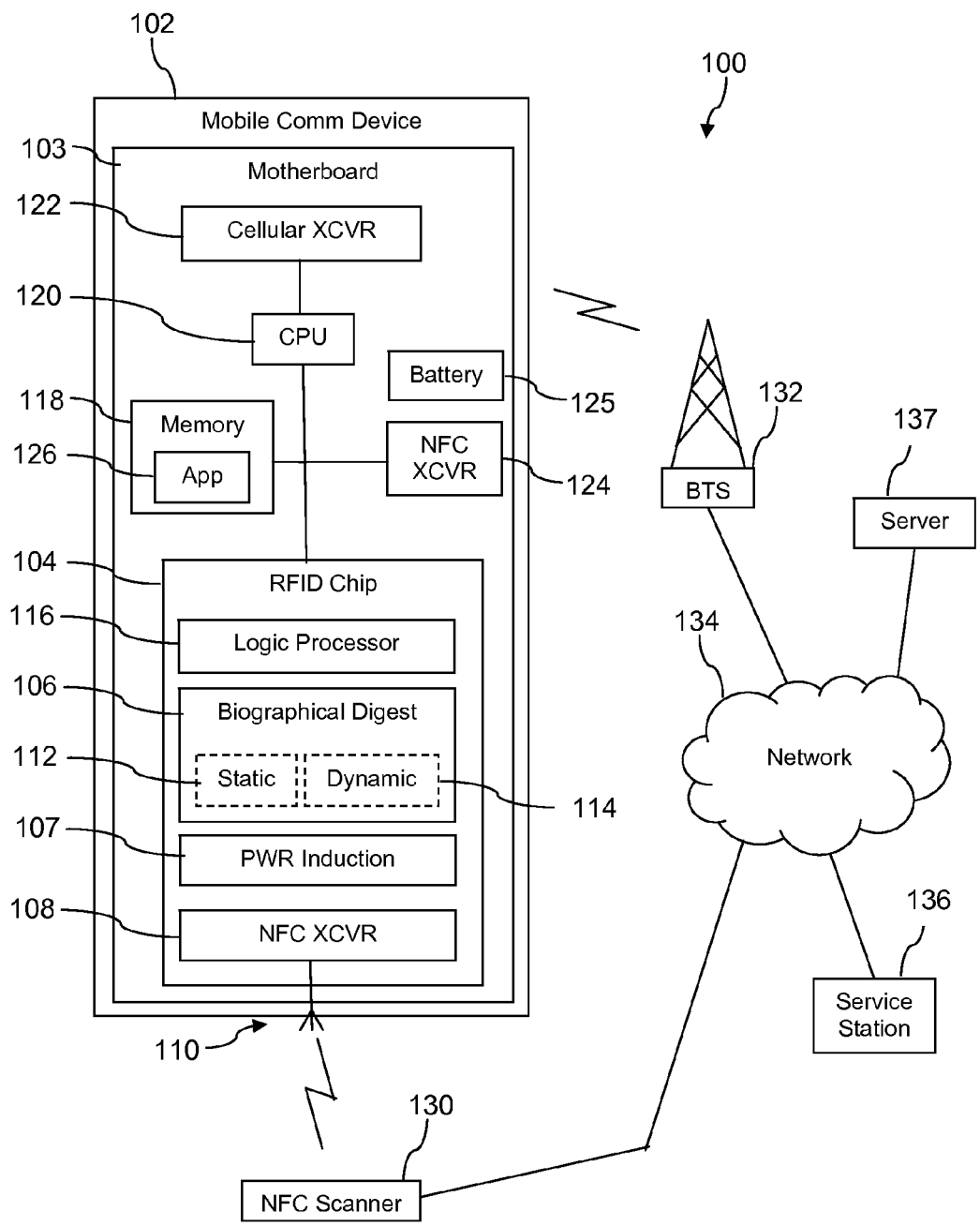
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Obtaining information about a mobile communication device may be desirable at numerous points in the life of the device. It is useful to be able to quickly and automatically identify and determine manufacturing information and configuration information about devices in a distribution center or order fulfillment center, for example to quickly scan all the devices stored in a master carton on a pallet in a warehouse. It is useful to be able to quickly and automatically identify and determine manufacturing information and configuration information about devices in a customer service environment, for example in a retail store where wireless communication subscribers might take their device to have a problem diagnosed and repaired. In some circumstances it is desirable to be able to access this information when the mobile communication device is not turned on and/or is not able to communicate.

In the case of determining information about a device at a retail store, devices in the past often provided some of this information in one or more bar codes under the removable battery. Devices, however, are evolving to non-removable batteries (that is, not removable by an end user or a customer service representative in a retail store), and providing a bar code behind the battery cover may not be useful to customer service representatives in determining this information under those circumstances. Putting the graphical information on an exterior of the device is not an aesthetically acceptable alternative.

It is understood that quickly and automatically determining this information about mobile communication devices from a sizeable assemblage of devices in a shipping box on a pallet in a warehouse may not be practicable using the bar coded information. Additionally, even in the current system employing bar codes that are readily accessible, the bar codes may be smudged or torn over time and hence may not be readable by a bar code scanner. When a store employee attempts to enter in the bar code number manually, for example by typing the numbers in using a keyboard, the employee may make errors. Even if no errors occur while entering the bar code number, the process may be slow and tedious, diminishing the customer satisfaction with the retail store and/or the wireless service provider or brand associated with the mobile communication device. This information about a mobile communication device may be made easily and automatically available for scanning by coupling a radio frequency identity (RFID) chip to the device, for example connecting the RFID chip to a motherboard of the mobile communication device. For further details on an RFID chip coupled to a mobile communication device see U.S. patent application Ser. No. 13/857,139, filed Apr. 4, 2013, entitled "Radio Frequency Identity (RFID) Chip Electrically and Communicatively Coupled to Motherboard of Mobile Communication Device," by Kevin R. Cordes, et al., which is incorporated by reference herein in its entirety.

The present disclosure teaches reusing infrastructure of a mobile communication device to improve the performance of an RFID chip coupled to the mobile communication device. The mobile communication device may comprise a plurality of antennas that may desirably be selectably coupled to the RFID chip during different operating modes. An application may command an antenna switch to couple a first antenna to the RFID chip when the mobile communication device is not turned on and when the mobile communication device is not yet activated. In this situation, the mobile communication device may be stowed inside a retail packaging box located inside a shipping carton with a plurality of other retail packaging boxes. A radio frequency (RF) field radiated external to the shipping carton may be attenuated when traveling through several layers of packaging to reach the RFID chip. By coupling the RFID chip to the first antenna, for example an antenna with a relatively longer length and hence an ability to capture more power from an incident RF field, the RFID chip may obtain sufficient power to energize and respond to queries from an external scanner. The term antenna switch is used broadly herein to refer to an electrically or electronically controllable coupling device to couple the RFID chip to one or more antennas or antenna segments in response to control inputs. The "antenna switch" may be implemented by a switch, by a hybrid coupler, or by another coupling device. In an embodiment, the antenna switch may be implemented by a soft switch. In an embodiment, one or more antennas may be located within the RFID chip, and one or more of these antennas may be coupled to the RFID chip, depending on the operational conditions as described further herein.

As known to one of skill in the art, activation of a mobile communication device is a process that initializes the device (e.g., a mobile phone) for service. A variety of different steps may be involved during activation for different wireless communication service carriers. The process may involve, for example, associating an electronic serial number (ESN) or a mobile equipment identity (MEID) with a phone number and a subscription account. It may involve provisioning the subscription account in the service provider network. Activation of a mobile communication device is distinctly different from activating an RFID chip, which may comprise supplying power to the RFID chip so that it becomes electrically active, for example responsive to a query to transmit stored data or information. For example, when exposed to a radio frequency field, an RFID chip may activate and power on based on power induced by the RF field in an antenna of the RFID chip or, as taught herein, in an antenna in a mobile communication device and coupled to the RFID chip.

The application may command the antenna switch to couple a second antenna to the RFID chip when the mobile communication device is not turned on and the device has been activated. In this situation, the mobile communication device is likely outside of a shipping box and a retail packaging box and need not capture as much energy from an incident RF field. In fact, in this situation, the first antenna might capture and deliver too much energy from an incident RF field and cause damage to the mobile communication device. The second antenna may be a relatively shorter length and hence capture less power from the incident RF field than the first antenna.

The application may command the antenna switch to couple a third antenna to the RFID chip when the mobile communication device is turned on and the RFID chip can draw power from the battery of the mobile communication device. In this situation, the mobile communication device may have sufficient power to use a very short antenna because it may be able to transmit with a higher energy level because ample electrical power is available to it.

The application may command the antenna switch to couple two different antennas to the RFID chip at the same time, for example one antenna for capturing power from an incident RF field and another antenna for communicating with an RFID scanner device. The antennas the application may command to couple to the RFID chip may be selected based on a battery power availability state, an activation state, and other information. The application may command the antenna switch to couple one or more antennas to the RFID chip based on a stored power level or a stored energy level of the battery. Thus, in an embodiment, the battery power may be monitored at a more granular level than just "battery power available" and "battery power unavailable" states but may be monitored over a range of battery power levels—for example across a range of 0%, 10%, 20%, 30%, 40%, 50%, 60%, 70%, 80%, 90%, and 100% battery power available or some other range of battery power available values.

The activation state of the mobile communication device may be stored in a dynamic portion of a memory of the RFID chip. The activation state may be initialized to the inactivated state in the dynamic portion of the memory of the RFID chip by an original equipment manufacturer. When the device is activated for wireless communication services with a mobile communication service provider, the activation state may be changed to activate in the dynamic portion of memory of the RFID chip. The activated value may be written to the dynamic portion of memory of the RFID chip by an application that executes on the mobile communication device. The dynamic portion of the memory of the RFID chip may be accessed by the processor of the mobile communication device as if it were a block of memory of the device, for example using what may be referred to as memory-mapped input/output (I/O). Said in other words, the processor of the mobile communication device may communicate with the dynamic portion of the memory of the RFID chip using the same instructions, and the same bus, as between the processor and system memory and/or RAM.

In an embodiment, the application may command the antenna switch to shunt some or all of the power induced in an antenna coupled to the RFID chip to a power dissipation filter. As used herein, a power dissipation filter may be any circuit that is purpose designed to consume and dissipate electrical power, for example a filter that comprises a resistor. The power dissipation filter may be designed to only dissipate power above a pre-defined power level. For example, current may flow into the power dissipation filter and dissipate energy as heat in a resistor only when a terminal voltage of the power dissipation filter exceeds some predetermined level. The power shunted to the power dissipation filter may be rectified from an alternating current to a direct current before it is delivered to the power dissipation filter, for example in a power conditioning circuit between the antenna or antennas and the RFID chip.

In an embodiment, the application may command the antenna switch to shunt some or all of the power induced in an antenna coupled to the RFID chip to a battery of the mobile communication device, possibly shunted via a rectification circuit. The application may make a decision to shunt power induced in an antenna coupled to the RFID chip to the power dissipation filter and/or to the battery based, at least in part, on a power level of the battery.

Turning now to FIG. 1A, a system 100 is described. In an embodiment, system 100 comprises a mobile communication device 102. The mobile communication device 102 comprises a motherboard 103, a radio frequency identity (RFID) chip 104 that comprises a near field communication (NFC) transceiver 108. In an embodiment, the RFID chip comprises a biographical digest 106, an RFID antenna 110, and a logic processor 116. In a preferred embodiment, the RFID chip 104 does not comprise the RFID antenna 110 and instead may rely solely on one or more antennas in the device 102 (for example, antennas coupled to the motherboard 103 of the mobile device 102). Notwithstanding this preferred embodiment, however, in some embodiments the RFID chip 104 may comprise one or more RFID antennas internal to the package of the RFID chip 104.

In an embodiment, the RFID chip 104 may not comprise the biographical digest 106 and may comprise a memory. Alternatively, the RFID chip 104 may comprise a memory, and the biographical digest 106 may be a restricted portion of the memory. The RFID chip 104 is connected or communicatively coupled to a motherboard or circuit board of the mobile device 102 and is connected or communicatively coupled to one or more of a memory bus, a data bus, and/or an address bus of the motherboard. The RFID chip 104 comprises a power induction component 107 that derives electrical power to energize the RFID chip 104 from radio frequency (RF) energy incident on the device 102, for example an RF field captured by one of the antennas of the mobile communication device 102. In at least some modes of operation, the RFID chip 104 relies upon the power induction component 107 to energize the RFID chip 104 so it can function (e.g., respond to a request to transmit its data to the NFC scanner 130). For example, when the mobile communication device 102 is turned off and/or when the battery 125 is depleted or not installed, the RFID chip 104 may only be functional when the power induction component 107 energizes the RFID chip 104.

The mobile communication device 102 may further comprise a memory 118, a central processing unit (CPU) 120, a cellular radio frequency (RF) transceiver 122, a general purpose near field communication transceiver 124, and a battery 125. Note that before the mobile communication device 102 is activated, for example while it is sitting in a retail package box, the mobile communication device 102 may not have a battery 125 (e.g., the battery 125 may be outside of the device enclosure, in the retail package box). The battery 125 may provide power to all the active components of the mobile communication device 102 in some operation modes. The battery 125 may also provide power to the RFID chip 104 in some operation modes of the RFID chip 104. The components 104, 118, 120, 122, 124, 125, and other components of the mobile communication device 102 may be coupled together and/or physically secured by the motherboard 103. The motherboard 103 may provide communications among components, for example providing a data bus, a communication bus, an address bus, a control bus, a power bar, a ground plane, and the like. For example, in an embodiment, the motherboard 103 provides a communication bus, and the cellular RF transceiver 122, the central processing unit 120, the RFID chip 104 are connected to the communication bus of the motherboard 103. In some contexts, the central processing unit 120 may be referred to as a CPU or as a processor.

In some embodiments, the device 102 does not comprise the near field communication transceiver 124. The device 102 comprises a plurality of antennas. The biographical digest 106 or other memory of the RFID chip 104 may be abstractly considered to be part of the memory 118 or part of the memory map of the mobile communication device 102, because the biographical digest 106, via the mediation of an application 126, may be addressable on an address bus and readable via a data bus and/or memory bus of the mobile communication device 102.

The general purpose NFC transceiver 124 may be used for completing point-of-sale (POS) transactions, for obtaining access to a building via a handshake with an electronic entry scanner, for paying mass transit system fares, and for other transactions or exchanges of confidential information associated with application layer functionality visible to a user of the device 102.

The cellular transceiver 122 may communicate with a network 134 via a wireless communication link that may be established with a base transceiver station 132 that is communicatively coupled to the network 134. The wireless communication link may be established in accordance with any of a code division multiple access (CDMA) wireless protocol, a global system for mobile communication (GSM) wireless protocol, a long term evolution (LTE) wireless protocol, a worldwide interoperability for microwave access (WiMAX) wireless protocol, or other cellular communication wireless protocol. The wireless communication link between the cellular transceiver 122 and the base transceiver station 132 may support voice communication and/or data communication. These communication modes may include voice-to-voice communication, short message service (SMS) communication, multimedia message service (MMS) communication, email communication, HTTP communication such as retrieving hypertext markup language (HTML) content from a web server or other content server.

The network 134 may comprise one or more private networks, one or more public networks, and/or a combination thereof. It is understood that the system 100 may comprise any number of base transceiver stations 132 and any number of mobile devices 102. In an embodiment, a service station 136 such as a retail store clerk work station or a customer care work station may be communicatively coupled to the network 134. In an embodiment, a server computer 137 may be coupled to the network 134 and able to communicate to the mobile communication device 102 via the network 134 and the base transceiver station 132.

In an embodiment, a near field communication (NFC) scanner 130 may be communicatively coupled to the network 134. The NFC scanner 130 may provide an energizing radio field to activate and/or provide power to the RFID chip 104 and may read information from the RFID chip 104, for example may read the biographical digest 106 and/or the information contained in the biographical digest 106 from the RFID chip 104 and/or information contained in a memory of the RFID chip 104, for example when the RFID chip 104 transmits the information via the NFC transceiver 108 and RFID antenna 110 or via an antenna of the device 102.

The NFC scanner 130 communicates with the RFID chip 104 using near field communications. As used herein, near field communications employed by the NFC scanner 130 may be limited to relatively short distance, for example less than about 20 inches or less than about 10 inches. At the same time, in a preferred embodiment, the present disclosure contemplates use of a NFC scanner 130 that may communicate using stronger fields that are effective over greater distances (e.g., over distances of at least 15 feet) and/or that are able to penetrate cardboard master shipping cartons and/or individual shipping containers for mobile communication devices. Because the NFC scanner 130 may provide the energizing radio field, the RFID chip 104 may be scanned by the NFC scanner 130 even when the mobile communication device 102 is turned off, when a battery (not shown) of the device 102 is not installed, and/or when the battery of the device 102 is discharged. Additionally, the RFID chip 103 may be scanned by the NFC scanner 130 even when the mobile communication device 102 is unable to communicate, for example when the device 102 is broken in some way. In an embodiment, the NFC scanner 130 may be able to write into a storage location of the RFID chip 104 that is separate from the biographical digest 106, and the application 126 may read the information written into the storage location of the RFID chip 104 by the NFC scanner 130.

In an embodiment, the biographical digest 106 comprises information about the mobile communication device 102, for example a manufacturer identity, a device model identity, an initial hardware version identity, an initial software version identity, an initial preferred roaming list identity, a current software version identity, a current preferred roaming list identity, and other information about the device 102. The biographical digest 106 may comprise a static portion 112 and a dynamic portion 114. The static portion 112 may be disabled for writing, for example after the mobile communication device 102 has shipped from assembly plant of the original equipment manufacturer. The dynamic portion 114 may be enabled for writing, for example enabled for writing to from the CPU 120 via a communications bus of the motherboard 103. The biographical digest 106 may be stored in a memory portion of the RFID chip 104, for example a semiconductor memory portion. The biographical digest 106 may be read wirelessly, for example read wirelessly by the NFC scanner 130. For further information on a biographical digest on an RFID chip, see U.S. patent application Ser. No. 13/857,141, filed Apr. 4, 2013, titled "Digest of Biographical Information for an Electronic Device with Static and Dynamic Portions," by Kevin R. Cordes, et al., which is incorporated by reference herein in its entirety.

An application 126 may be stored in the memory 118 and executed by the central processing unit 120 to write to the dynamic portion 114 of the biographical digest 106 via one or more buses of the mobile device 102. The application 126 may implement and/or enforce rules for accessing and interacting with the biographical digest 106. The application 126 further may provide antenna switch control commands, as discussed further hereinafter with reference to FIG. 1B. Alternatively, an application executed by the logic process 116 of the RFID chip 104 may provide antenna switch control commands.

The mobile communication device 102 may be any of a mobile phone, a personal digital assistant (PDA), a media player, a laptop computer, a notebook computer, a tablet computer, a removable wireless interface component, a head unit or telematics unit configured for installation into a vehicle, or other mobile communication device. The service station 136 and/or the NFC scanner 130 may be implemented as computers. Computer systems are described in detail hereinafter.

Figure 1B:
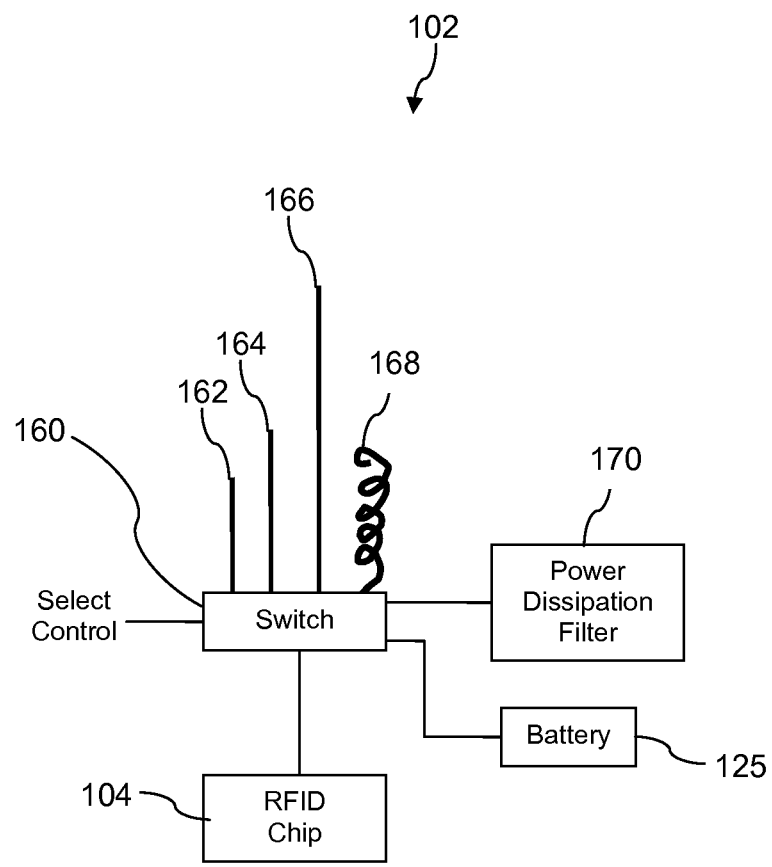
FIG. 1B is a bock diagram of a portion of a mobile communication device according to an embodiment of the disclosure.

Turning now to FIG. 1B, further details of the mobile communication device 102 are described. The mobile communication device 102 comprises a plurality of different antennas, for example a first antenna 162, a second antenna 164, a third antenna 166, and a fourth antenna 168. It is understood that different numbers of different antennas may be provided in different models of mobile communication device 102. While four different antennas are shown in FIG. 1B, in another embodiment, two different antennas may be provided, three different antennas may be provided, or more than four different antennas may be provided. The antennas 162-168 are drawn differently in FIG. 1B, but these graphical representations are not intended to accurately depict the physical configuration of the antennas 162-168. The antennas 162-168 may have different lengths and/or different shapes. In an embodiment, an antenna may be reconfigurable to establish different antennas or different lengths of antennas by coupling, decoupling, or shorting to ground different segments of the antenna.

The antennas 162-168 may be selected to be coupled to the RFID chip 104 by a switch 160. In some contexts, the switch 160 may be referred to as an antenna switch. A select control input to the switch 160 may control which of the antennas 162-168 are coupled to the RFID chip 104 and which antennas 162-168 are decoupled to the RFID chip 104. It is understood that the switch 160 may be implemented by a variety of different devices referred to by a variety of different terms. In an embodiment, the switch 160 may be implemented as a coupler or as a hybrid coupler or by some other device. In an embodiment, the switch 160 may be implemented by a soft switch. In an embodiment, the switch 160 may be implemented as a plurality of switches and/or couplers. For example, the switch 160 may be partly implemented as two or more couplers that selectively couple together or decouple multiple segments of an antenna. The switch 160 may comprise one or more couplers that selectively couple one or more portions of an antenna to ground, effectively reconfiguring the antenna (e.g., shortening the antenna).

In an embodiment, only a single antenna 162-168 may be coupled to the RFID chip 104 at a time. In another embodiment, at least two antennas 162-168 may be coupled to the RFID chip 104 at the same time, for example one antenna coupled to the power induction component 107 of the RFID chip 104 to provide induced power from an incident radio frequency field and another antenna coupled to the NFC transceiver 108 of the RFID chip 104 to promote radio communication between the RFID chip 104 and the NFC scanner 130. The select control input may be provided by the application 126 executing on the central processing unit 120 or by the logic processor 116 of the RFID chip 104.

One of the antennas 162-168 may be communicatively coupled to the cellular radio transceiver 122. The cellular radio transceiver 122 may be permanently coupled to an antenna 162-168 or it may be coupled to an antenna 162-168 via the switch 160. Likewise on of the antennas 162-168 may be communicatively coupled to the NFC transceiver 124, via the switch 160 or permanently.

In an embodiment, one or more of the antennas 162-168 may be selected to be coupled to a power dissipation filter 170 and/or to the battery 125 by the switch 160 under control of the select control. The application 126 or the logic processor 116 of the RFID chip 104 may couple one or more of the antennas 162-168 to dissipate and/or store energy (e.g., flow current to the battery 125) induced in these antennas by an incident radio frequency field, whereby interference with other antennas may be avoided and/or whereby excessively high voltage levels are dissipated to avoid damage to electrical circuits such as circuits in the RFID chip 104. The switch 160 may be an electronic switch. The switch 160 may be an electronic variable impedance device.

The application 126 or the logic processor 116 may control the switch 160 (e.g., provide a control input to the select control of the switch 160) based on analysis described further above. Selected switching (using the switch 160) of antennas 162-168, to the RFID chip 104 or to the power dissipation filter 170 or the battery 125, may be determined in part based on the activation state of the mobile communication device 102. When the mobile communication device 102 is in an activated state, the application 126 or the logic processor 116 does not select to couple one of the antennas 162-168 to the RFID chip 104, wherein the subject antenna is known to capture and deliver a high amount of induced power. It is thought that when activated, the mobile communication device 102 is outside of the packaging box and shipping cartons, and use of the subject antenna to capture power from an incident RF field may overload the circuits of the device 102 and possibly damage some of its circuits.

The selected switching of antennas 162-168 to the RFID chip 104 may also be determined, at least in part, based on a communication state of the cellular RF transceiver 122. For example, when the cellular RF transceiver 122 is communicating via the first antenna 162, the application 126 or the logic processor 116 may decouple the RFID chip 104 from the first antenna 162 via the switch 160. In this mode, the application 126 or the logic processor 116 may select a different antenna, for example the second antenna 164, to be coupled to the RFID chip 104 via the switch 160. Alternatively, in this mode, the application 126 or the logic processor 116 may select to decouple the RFID chip 104 from all antennas 162-168 while the cellular RF transceiver 122 is communicating. In an embodiment, the application 126 or the logic processor 116 may select the antenna switch 160 to couple a first one of the antennas to the RFID chip 104 based on the mobile communication device 102 being engaged in voice communication via the cellular RF transceiver 122 and selects the antenna switch 160 to couple to a second one of the antennas to the RFID chip 104 based on the mobile communication device 102 being engaged in data communication via the cellular RF transceiver 122.

Selected switching may be determined based on a pre-defined threshold of induced power level. For example, when an antenna 162-168 induces power from an incident RF field above the pre-defined power threshold, the application 126 or the logic processor 116 may command the switch, via the select control, to shunt the excess power to one of the power dissipation filter 170 or the battery 125. When the induced power drops below the pre-defined power threshold (or below a second pre-defined power threshold, lower than the first pre-defined threshold, associated with a transition out of the power shunting mode), the application 126 or the logic processor 116 may command the switch to stop shunting excess power from the subject antenna. In an embodiment, when the mobile communication device 102 is turned on and powered from the battery 125, the application 126 or the logic processor 116 selects the switch 160 to couple one or more of the antennas 162-168 to the battery.

The application 126 or the logic processor 116 may select the antenna switch 160 to couple one of the antennas to the RFID chip 104 based on at least a power on state and a power off state of the mobile communication device 102. The application 126 or the logic processor 116 may select the antenna switch 160 to couple one of the antennas to the RFID chip 104 based on at least an activated state and an inactivated state of the mobile communication device 102. The application 126 or the logic processor 116 may command the switch 160 to couple a first one of the antennas to the RFID chip 104 to provide power induced in the antenna by a radio frequency field radiated outside of the mobile communication device 102 and to couple a second one of the antennas to the RFID chip 104 to provide wireless read access to the biographical digest 106 and/or memory of the RFID chip 104.

Figure 2:
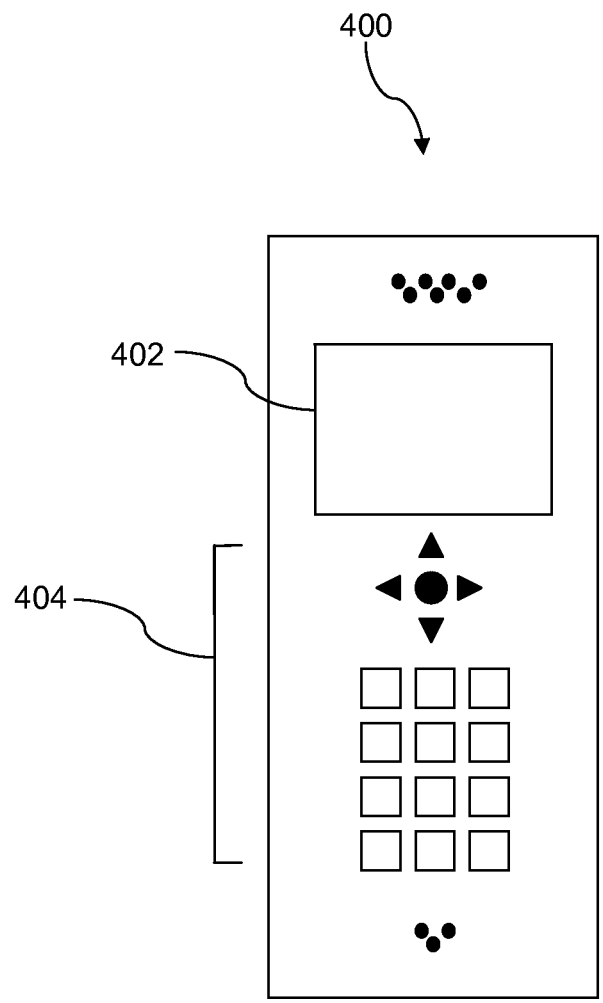
FIG. 2 is an illustration of a handset according to an embodiment of the disclosure.

FIG. 2 depicts the mobile device 400, which is operable for implementing aspects of the present disclosure, but the present disclosure should not be limited to these implementations. For example, in an embodiment, the mobile communication device 102 described above with reference to FIG. 1A and FIG. 1B may be implemented as the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 3:
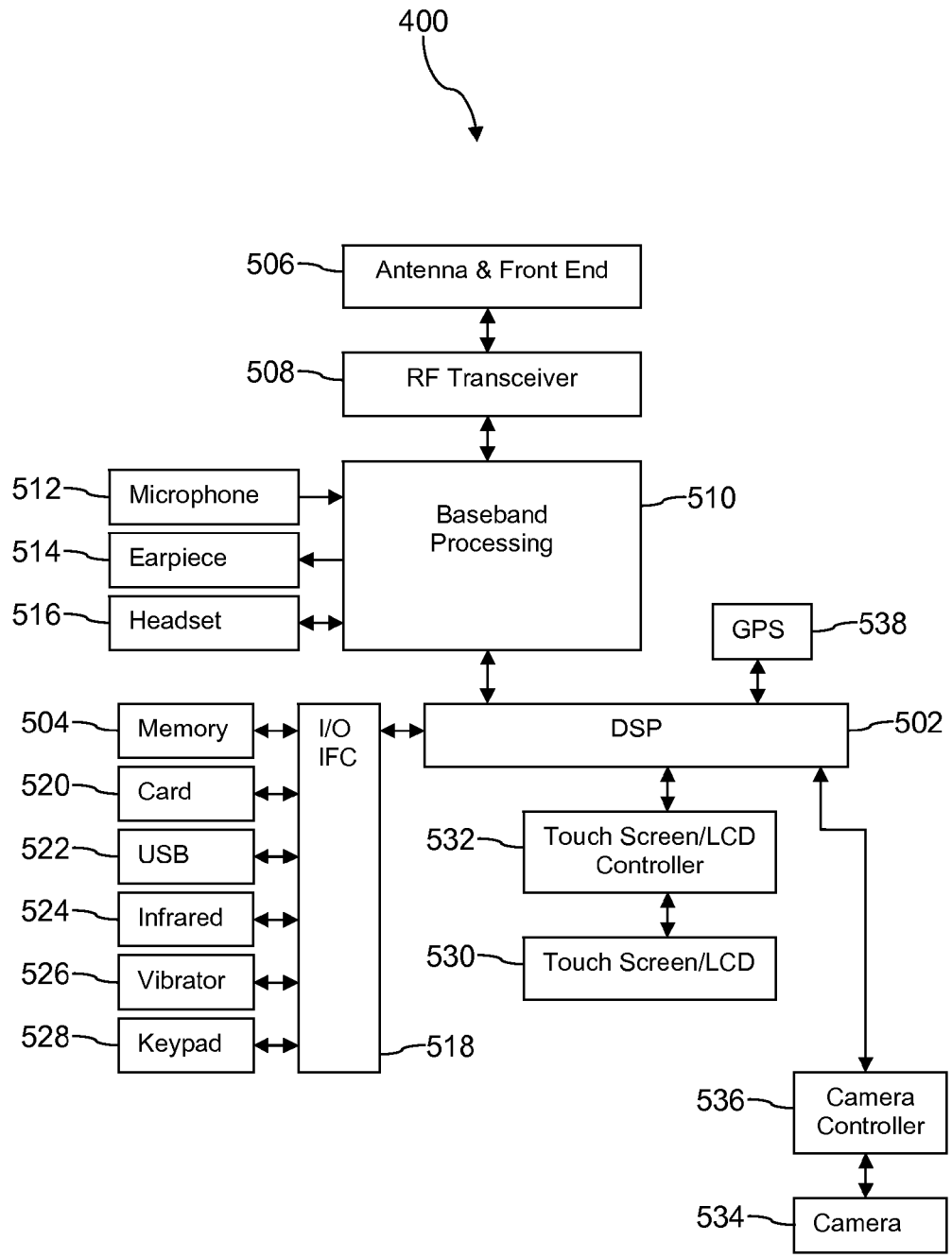
FIG. 3 is a block diagram of a hardware architecture of a mobile communication device according to an embodiment of the disclosure.

FIG. 3 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 4A:
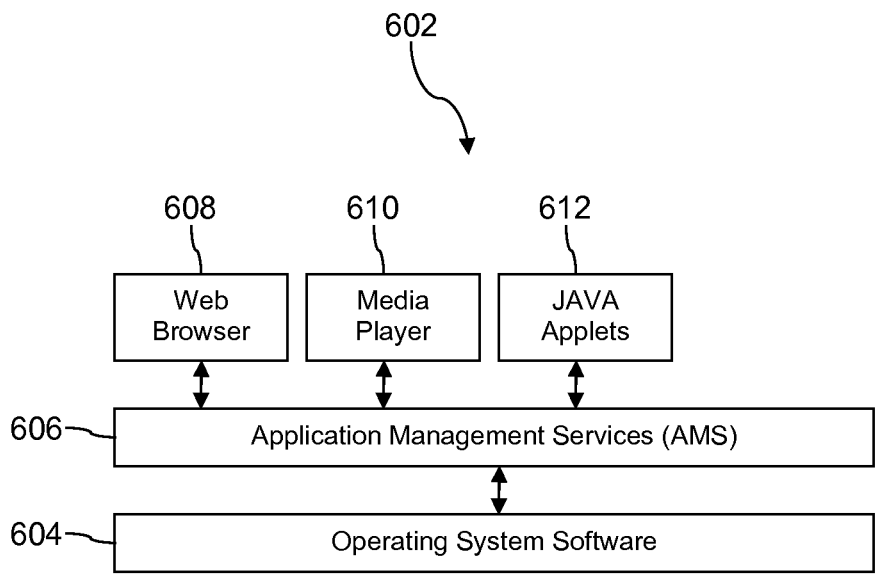
FIG. 4A is a software architecture of a mobile communication device according to an embodiment of the disclosure.

FIG. 4A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 4A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 4B:
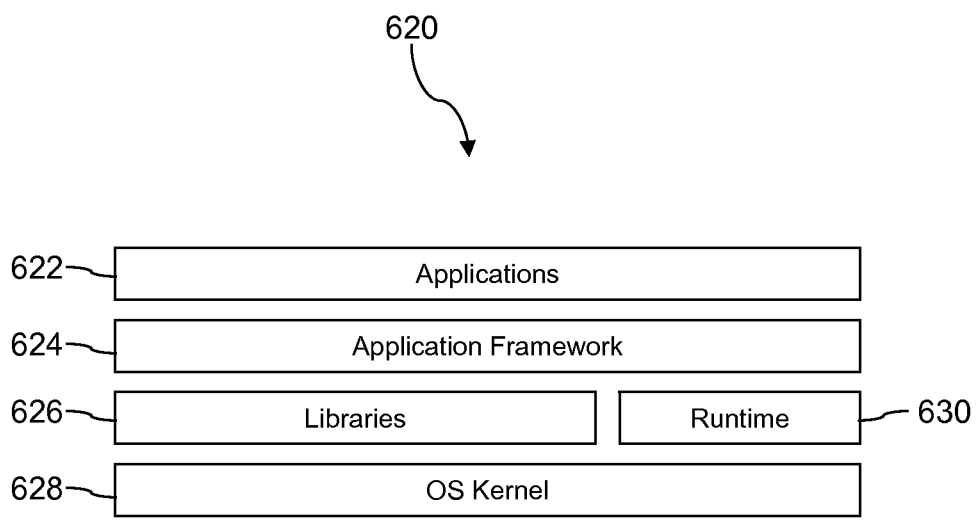
FIG. 4B is another software architecture of a mobile communication device according to an embodiment of the disclosure.

FIG. 4B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a motherboard comprising a communication bus;
a cellular radio frequency transceiver connected to the communication bus of the motherboard;

a plurality of antennas, at least one of the antennas communicatively coupled to the cellular radio frequency transceiver;

a processor connected to the communication bus of the motherboard;

a radio frequency identity (RFID) chip connected to the communication bus of the motherboard, wherein the RFID chip comprises a memory, provides wireless read access to the memory, and provides write access to the memory to the communication bus of the motherboard;

an antenna switch to selectably couple at least one of the antennas to the RFID chip; and an application that selects the antenna switch to couple one of the antennas to the RFID chip based on a state of the mobile communication device, wherein the antenna switch selectably couples a first one of the antennas to the RFID chip to provide power induced in the antenna by a radio frequency field radiated outside of the mobile communication device and couples a second one of the antennas to the RFID chip to provide wireless read access to the memory.

2. The mobile communication device of claim 1, wherein the cellular radio frequency transceiver is operable to communicate wirelessly according to one of a code division multiple access (CDMA) protocol, a global system for mobile communications (GSM) protocol, a worldwide microwave access (WiMAX) protocol, or a long term evolution (LTE) protocol.

3. The mobile communication device of claim 1, wherein the application selects the antenna switch to couple one of the antennas to the RFID chip based on at least a power on state and a power off state of the mobile communication device.

4. The mobile communication device of claim 1, wherein the application selects the antenna switch to couple one of the antennas to the RFID chip based on at least an activated state and an inactivated state of the mobile communication device.

5. The mobile communication device of claim 1, further comprising a power dissipation filter and wherein the switch further selectively couples the coupled antenna to the power dissipation filter when an induced power level delivered to the RFID chip exceeds a pre-defined threshold.

6. The mobile communication device of claim 1, wherein the memory of the RFID chip comprises a static portion which is disabled for writing and a dynamic portion that is enabled for writing.

7. A mobile communication device, comprising:
a motherboard comprising a communication bus;
a cellular radio frequency transceiver connected to the communication bus of the motherboard;
a plurality of antennas, at least one of the antennas communicatively coupled to the cellular radio frequency transceiver;
a processor connected to the communication bus of the motherboard;
a radio frequency identity (RFID) chip connected to the communication bus of the motherboard, wherein the RFID chip comprises a memory that stores data about an activation state of the mobile communication device, provides wireless read access to the memory, and provides write access to the memory to the communication bus of the motherboard;
an antenna switch to selectably couple at least one of the antennas to the RFID chip; and
an application that selects the antenna switch to couple one of the antennas to the RFID chip based on the activation state of the mobile communication device stored in the memory and based in part on the mobile communication device being engaged in voice communication via the cellular radio frequency transceiver, wherein the application selects the antenna switch to couple a first one of the antennas to the RFID chip based on the mobile communication device being engaged in voice communication via the cellular radio frequency transceiver and selects the antenna switch to couple a second one of the antennas to the RFID chip based on the mobile communication device being engaged in data communication via the cellular radio frequency transceiver.

8. The mobile communication device of claim 7, wherein the memory of the RFID chip comprises a static portion which is disabled for writing and a dynamic portion that is enabled for writing, wherein the activation state of the mobile communication device is stored in the dynamic portion, and wherein the activation state of the mobile communication device is initially in the inactivated state when the mobile communication device is shipped from an original equipment manufacturer.

9. The mobile communication device of claim 7, wherein responsive to the activation state of the mobile communication device stored in the memory being activated, the application does not select to couple one of the plurality of antennas to the RFID chip that is an antenna that delivers a high amount of induced power.

10. The mobile communication device of claim 7, wherein the mobile communication device is one of a mobile phone, a personal digital assistant (PDA), a media player, a wearable computer, or a headset computer.

11. A mobile communication device, comprising:
a motherboard comprising a communication bus;
a cellular radio frequency transceiver connected to the communication bus of the motherboard;
a plurality of antennas, at least one of the antennas communicatively coupled to the cellular radio frequency transceiver;
a processor connected to the communication bus of the motherboard;
a radio frequency identity (RFID) chip connected to the communication bus of the motherboard, wherein the RFID chip comprises a memory, provides wireless read access to the memory, and provides write access to the memory to the communication bus of the motherboard;
a power dissipation filter;
an antenna switch to selectably couple one of the antennas to the RFID chip and to selectably couple the antenna to the power dissipation filter; and
an application that selects the antenna switch to couple the antenna to the RFID chip based on a state of the mobile communication device and that selects the antenna switch to couple the antenna to the power dissipation filter when an induced power level delivered to the RFID chip exceeds a pre-defined threshold.

12. The mobile communication device of claim 11, wherein the power dissipation filter dissipates power by flowing a current through a resistor.

13. The mobile communication device of claim 12, wherein the power dissipation filter comprises a capacitor in parallel with the resistor.

14. The mobile communication device of claim 11, wherein the power dissipation filter dissipates power by flowing a current to a battery of the mobile communication device.

15. The mobile communication device of claim 11, further comprising a rectifier that converts alternating current to direct current between the selected antenna and the power dissipation filter.

16. The mobile communication device of claim 11, wherein when the mobile communication device is turned on and powered by a battery, the application selects the antenna switch to couple the antenna to the power dissipation filter.

17. The mobile communication device of claim 11, wherein the mobile communication device is one of a mobile phone, a personal digital assistant (PDA), a media player, a wearable computer, and a headset computer.

\* \* \* \* \*